(12) United States Patent
Massey

(10) Patent No.: US 6,361,019 B1
(45) Date of Patent: Mar. 26, 2002

(54) FASTENING SYSTEM FOR CONNECTING ACTUATORS, OR OTHER ATTACHABLE DEVICES, TO ROTARY VALVES

(75) Inventor: Roger Massey, Portsmouth, NH (US)

(73) Assignee: Parker & Harper Companies, Inc., Raymond, NH (US)

( * ) Notice: Subject to any disclaimer, the term of this patent is extended or adjusted under 35 U.S.C. 154(b) by 0 days.

(21) Appl. No.: 09/636,472

(22) Filed: Aug. 10, 2000

(51) Int. Cl.[7] .......................... F16B 23/00; F16G 11/00; F16K 31/00; F16K 5/06
(52) U.S. Cl. .................... 251/292; 251/291; 251/315.1; 411/393; 403/316
(58) Field of Search ............................... 251/291, 292, 251/304, 315.01, 315.1; 411/393, 398; 403/316

(56) References Cited

U.S. PATENT DOCUMENTS

| | | | | |
|---|---|---|---|---|
| 4,132,093 A | * | 1/1979 | McDorman, Sr. ............ 70/231 |
| 4,135,838 A | * | 1/1979 | Vandenberg ................. 403/316 |
| 4,876,766 A | * | 10/1989 | Cohen ....................... 16/114 R |
| 5,113,899 A | * | 5/1992 | Younezawa ................. 137/461 |
| 5,136,863 A | * | 8/1992 | Richardson ..................... 70/14 |
| 5,553,831 A | * | 9/1996 | Ozaki et al. ................. 251/292 |

* cited by examiner

*Primary Examiner*—Kevin Shaver
*Assistant Examiner*—David A Bonderer
(74) *Attorney, Agent, or Firm*—Davis & Bujold, P.L.L.C.

(57) ABSTRACT

A connection for joining an actuator to a valve comprising providing at least two flanged pins each in the body of the valve, providing at least two mating holes in a body of the actuator, the mating holes being aligned with the pins, providing a tapped hole transverse to each of the mating holes, the valve body being joined to the actuator such that the pins mate slidably with the holes, with set screws in the tapped holes engaging the flanged pins to axially tension the pins to draw the valve body into physical contact with the actuator.

12 Claims, 1 Drawing Sheet

FASTENING SYSTEM FOR CONNECTING ACTUATORS, OR OTHER ATTACHABLE DEVICES, TO ROTARY VALVES

A novel fastening system for connecting actuators or similar attachable devices to rotary valves, providing not only a means for securely clamping the valve and device together, and resisting reaction loads, but also ensuring an accurate index between the units.

BACKGROUND OF THE INVENTION

The commonly used technique of clamping a bracket to a valve, then bolting the valve/bracket combination to an actuator often falls short of providing the required accurate indexing, particularly in cases where tightness of fit between the clamp and valve serves to locate the valve during final assembly with the actuator. Valves designed with integral mounting pads that permit direct actuator to valve bolting usually suffer this shortcoming as well, since, to fix the actuator position, they customarily depend on the fit between the attachment screws and clearance holes through which the attachment screws extend.

When greater indexing accuracy is demanded, dowel pins permanently fixed either to the valve or actuator that engage closely fitting holes in the other member, have been used successfully in conjunction with the attachment screws. Valve brackets that are machined to suit mating and locating features integral with the valve bodies have also proven successful.

Dowel pins provide good alignment accuracy, but suffer the disadvantages of machining time and expense required for their proper use, and dowel pins may not provide proper contact mating in the event the actuator or device requires replacement. The alternate use of machined valve brackets to provide for mating and alignment also suffers the disadvantages of added time and expense to manufacture and install the brackets.

SUMMARY OF THE INVENTION

It is an object of the invention to provide an improved mechanical method of quickly and accurately indexing an attachment for a valve to provide proper operating alignment of the attachment to the valve.

It is a further object of the invention to provide a positive means of engaging the contact surfaces between a valve and the attached device.

It is a further object of the invention to provide a mounting method which improves alignment and mating tolerances between valves and their attachments, without additional machining or intermediate parts.

The inventive method attaches valves to actuators, or similar devices, and satisfies the requirements of both soundness and accuracy, without recourse to dowel pins or other special fixtures. The subject method relies on two pins that are fast with the valve body, each pin being undercut near its exposed end, an actuator (or other device) with closely fitting mating holes that accept the pins, and means to secure the pins within the holes using cone-point or similarly shaped set screws that perpendicularly intersect the pins.

According to the invention there is provided a valve to attachment mounting system for joining an attachment to a valve having a valve body comprising: at least two flanged pins fast with one of the valve body and the attachment; at least two mating holes in the other of the valve body and the attachment for receiving the pins to locate the attachment relative to the valve body; a tapped hole extending transverse of each said mating hole; a screw engaging each said tapped hole; wherein said screws engagedly connect a flange of said flanged pins, axially tensioning said pins to draw said valve body into desired physical contact with said attachment.

Also according to the invention there is provided a rotary valve and an attachment connected by a mounting system comprising: at least two pins having a desired diameter and an axial centerline, said at least two pins each threadedly engaging a threaded bore in a valve body of the rotary valve; at least two holes in the attachment, each said hole having an axial centerline, each hole's axial centerline being coaxially aligned with a said pin's axial centerline; at least two tapped holes in the attachment, each with an axial centerline, each said tapped hole's axial centerline being perpendicular to and offset from an associated said mating hole's axial centerline; at least two screws, each set screw threadedly engaging one of said tapped holes; wherein said valve body is mated to said rotary valve attachment such that said at least two pins slidably mate with said at least two mating holes; and each said screw engagedly connects with an annular flange of a said pin to axially tension said at least two pins to draw said valve body to physical contact with said attachment.

Also according to the invention there is provided a method for connecting attachments to rotary valves comprising the steps of: fastening at least two flanged pins each to a bore in one of a valve body of the rotary valve and the attachment; machining at least two mating holes in the other of the valve body and the attachment, said mating holes being alignable with said pins; machining a tapped hole transversely of each of said mating hole; joining said valve body to said rotary valve attachment such that said pins mate slidably with corresponding said mating holes; and screwing a screw into each of said tapped holes; whereby said screws engagedly connect with each of said at least two flanged pins axially to tension said at least two pins to draw said valve body to physical contact with said rotary valve attachment.

Also according to the invention, there is also provided a valve to attachment mounting system for joining an attachment to a valve having a valve body comprising: at least two flanged pins fast with the valve body; at least two mating bores in the attachment for receiving the pins to locate the valve body relative to the attachment; a tapped hole in said attachment extending transverse of each said mating bore; a screw engaging each said tapped hole; wherein said screws engagedly connect with said flanged pins, axially tensioning said pin to draw said attachment into desired physical contact with said valve body.

BRIEF DESCRIPTION OF THE DRAWINGS

The invention will now be described, by way of example, with reference to the accompanying drawings, in which.

DESCRIPTION OF THE PREFERRED EMBODIMENT

Figure 1:
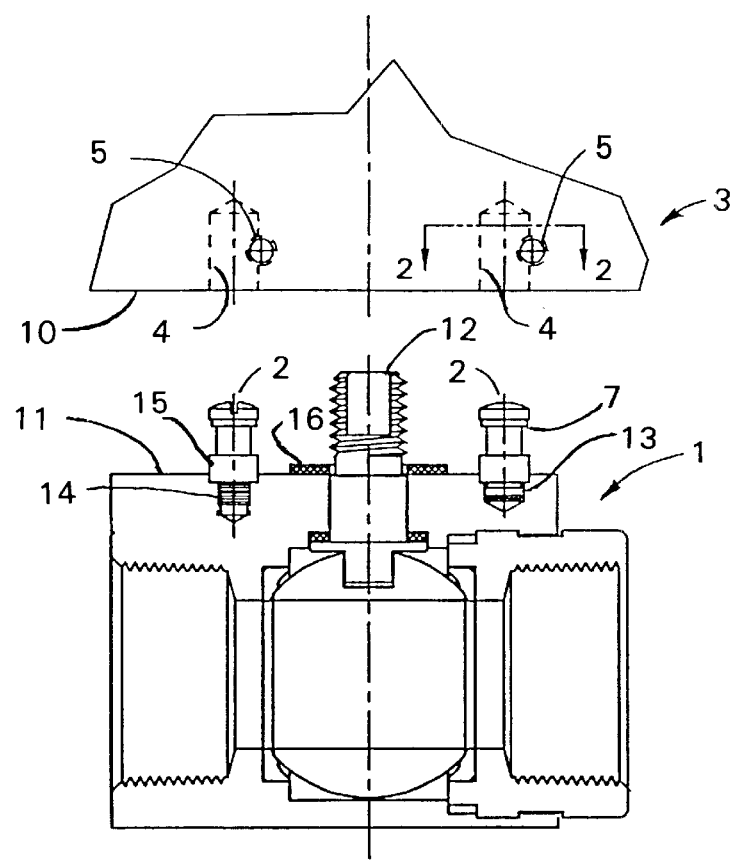
FIG. 1 represents a ball valve, equipped with fixed pins, and the lower portion of an actuator or other device positioned to be coupled to the valve.
Figure 3:
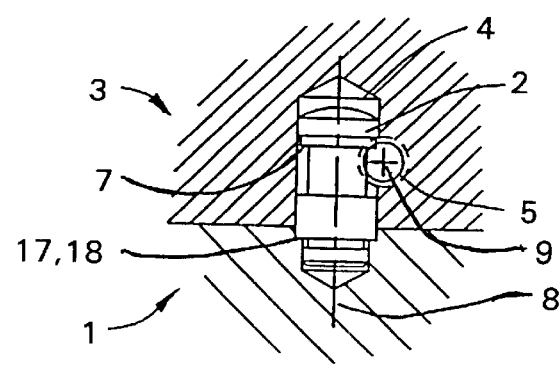
FIG. 3 shows section 3—3, taken through the centerline of a hole in FIG. 2, showing the position of a tapped hole relative to a pin.

In the accompanying drawings, FIG. 1 represents a standard ball valve 1, equipped with flanged pins 2 fixedly engaged in the valve 1 body. Item 3 represents the valve mating portion of an actuator 3 or other device positioned to be coupled to valve 1. Actuator 3 is provided with holes 4 to accept pins 2. Holes 4 are shown in FIGS. 1 and 3 as blind holes, but in practice, holes 4 may be through holes depending on the geometry of actuator 3. A second pair of holes 5 are tapped (threaded) to accept cone-point set screws 6.

Figure 2:
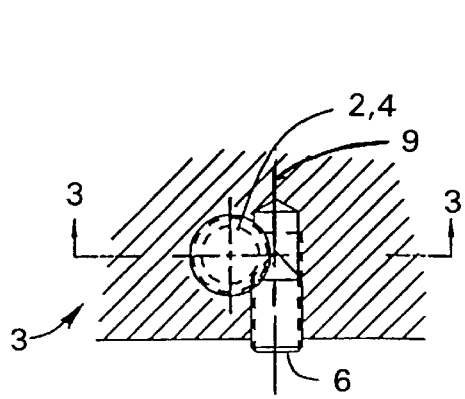
FIG. 2 shows section 2—2 through the actuator of FIG. 1, wherein a pin is shown secured by a cone-point set screw.

It is to be understood that the ball valve shown in FIGS. 1, 2, and 3 is representative, as the invention is intended for any valve body or valve bonnet designed for an adapter or actuator, which is suitable for the inventive connection method.

FIG. 2 shows Section 2—2 through a blind hole 4 in actuator 3 of FIG. 1, with pin 2 in hole 4 secured by a cone-point set screw 6. FIG. 3 shows section 3—3, taken through the centerline of a hole 4 in FIG. 2, section 2—2, showing the position of tapped hole 5 relative to pin 2.

In operation, actuator 3 is placed onto valve 1 so that pins 2 slidably engage holes 4. Set screws 6 are installed in tapped holes 5 and are screwed in until they contact shoulders 7 of pins 2. The relationship of centerline 8 of pins 2 and centerline 9 of set screws 6 are such that, following initial contact between pins 2 and set screws 6, further tightening set screws 6 draws the lower surface 10 of actuator 3 into firm contact with the upper surface 11 of valve 1.

The flanged pins 2 slidably fit holes 4 and thereby provide an accurate index of valve and actuator. Pins 2 are machined to form a waisted area removed from the valve body engagement area. An annular flange (shoulder or lip area) extends radially outwardly from the waisted area and forms with that area the engagement site for set screws 6. The surface area of pin 2 directly in contact with set screw 6 is slightly relieved to avoid jamming pin 2 in hole 4 due to burring of the pin following contact with the set screw. To achieve accurate indexing, the preferred embodiment is to machine pins 2 and holes 4 to mate with a low clearance fit.

In the preferred embodiment, pins 2 are fast with valve 1. Permanent and non-permanent fastening of pins 2 may be accomplished in a variety of ways, two of which are shown in FIG. 1. In FIG. 1, the pin to the right of stem 12 has permanently swaged end 13 connectedly engaging the valve body; while the pin on the left of stem 12 has threaded end 14 screwed in the valve body; the left pin being guided by a counterbore 15 slidably fitting the upper portion of the unthreaded part of the pin with a light interference fit.

For threaded pins 2, a slot, illustrated as an example in FIG. 1, or alternately available commercial fastening tool engagement means, including phillips head, square drive, or star drive may be employed for threading pins 2 into valve 1. Additional embodiments for permanently fastening pins 2 to valves 1 include, but are not limited to: stud welding, use of an interference cylindrical fit and adhesive bonding. Adhesive bonding may also be used to permanently fasten threaded pins to the valve body.

Set screw 6 engages pin 2, by means of the tapering (cone shaped) portion of set screw 6, thus providing the motive force to draw valve 1 into contact with valve actuator 3. Set screws 6 may also be permanently or semi-permanently fastened within holes 5, with a thread locking compound or similar method, to avoid vibration loosening of or unwanted removal of the set screws.

In practice, some adjustment of engagement depth and standout length for pins 2 may be required to optimize the location of contact between pins 2 and set screws 6, or to achieve maximum tightness between valve 1 and actuator 3. One embodiment of this adjustment process is to locate and machine holes 5 from known standout lengths of pins 2. Another embodiment of this adjustment process is to select a gasket 16, shown in FIG. 1, of predetermined thickness, to provide a tight fit between valve 1 and actuator 3. As shown in FIGS. 1 and 3, the preferred embodiment of the invention is to counterbore a recess 17 into valve 1 against which a shoulder 18 of pin 2 firmly engages. This counterbore ensures pins 2 will be aligned perpendicular to surface 11 of valve 1.

Conversely, the length of pins 2 may be selectively chosen or machined to provide necessary adjustment between valve 1 and actuator 3.

It is to be understood that cone-point set screws 6 may be of variable diameter, material, or length to suit the size(s) or material(s) of the valve 1 or actuator 3, or to meet valve design conditions. Set screw end shapes that may also be employed include rounded and tapered.

Reference Numerals

| | |
|---|---|
| 1 | valve |
| 2 | flanged pins |
| 3 | actuator |
| 4 | hole |
| 5 | hole |
| 6 | screw |
| 7 | shoulders |
| 8 | centerline |
| 9 | centerline |
| 10 | lower surface |
| 11 | upper surface |
| 12 | stem |
| 13 | end |
| 14 | end |
| 15 | counterbore |
| 16 | gasket |
| 17 | recess |
| 18 | shoulder |

I claim:

1. A valve to attachment mounting system for joining an attachment to a valve having a valve body comprising:
   at least two flanged pins fast with one of the valve body and the attachment;
   at least two mating holes in the other of the valve body and the attachment for receiving the pins to locate the attachment relative to the valve body;
   a tapped hole extending transverse of each said mating hole, each tapped hole defined about an axial centerline aligned perpendicular to and offset from an associated said mating hole's axial centerline;
   a screw engaging each said tapped hole; wherein
      said screws engagedly connect a flange of said flanged pins, axially tensioning said pins to draw said valve body into desired physical contact with said attachment.

2. The system of claim 1, wherein the pins are fast with the valve body, comprising each pin having an axial centerline parallel with an axial centerline of a rotary stem of said valve.

3. The system of claim 1, further comprising means for permanent fastening of said pins to said bores, said means selected from the group consisting of one of swaging, stud welding, interference fitting, and adhesive bonding.

4. The system of claim 1 wherein said valve is a rotary valve.

5. The system of claim 1 wherein said screws are cone point set screws.

6. The system of claim 1 wherein said screws are permanently fastened in said holes.

7. The system of claim 1 wherein said flanged pins are disposed with a waisted section and an annular shoulder adjacent to the waisted section; the flange being relieved to form the annular shoulder at the location of engagement of the screw with the flange.

8. A rotary valve and an attachment connected by a mounting system comprising:

at least two pins having a desired diameter and a first axial centerline, said at least two pins each threadedly engaging a threaded bore in a valve body of the rotary valve;

at least two holes in the attachment, each said hole having a second axial centerline, each hole's second axial centerline being coaxially aligned with said first axial centerline;

at least two tapped holes in the attachment, each tapped hole communicating with an associated one of said at least two holes in the attachment and each said tapped hole defined about a third axial centerline aligned perpendicular to and offset from the first and second axial centerline;

at least two screws, each screw threadedly engaging one of said tapped holes; wherein said valve body is mated to said rotary valve attachment such that said at least two pins slidably mate with said at least two holes; and each said screw engagedly connects with an annular flange of a said pin to axially tension said at least two pins relative to the valve body to draw said valve body into physical contact with said attachment.

9. A method for connecting attachments to rotary valves comprising the steps of:

fastening at least two flanged pins each to a bore in one of a valve body of the rotary valve and the attachment;

machining at least two mating holes in an other of the valve body and the attachment, said mating holes being alignable with said pins;

machining a tapped hole extending transverse of each said mating hole, each tapped hole defined about an axial centerline aligned perpendicular to and offset from an associated said mating hole's axial centerline;

joining said valve body to said rotary valve attachment such that said pins mate slidably with corresponding said mating holes; and screwing a screw into each of said tapped holes; whereby said screws engagedly connect with each of said at least two flanged pins axially to tension said at least two pins to draw said valve body to physical contact with said rotary valve attachment.

10. The method of claim 9 comprising permanently fastening said at least two pins.

11. The method of claim 9 comprising using screws in the form of cone shaped set screws.

12. A valve to attachment mounting system for joining an attachment to a valve having a valve body, comprising:

at least a first and second flanged pins fast with the valve body;

at least a first and second mating bores having a respective first axial centerline in the attachment for receiving the flanged pins to locate the valve body relative to the attachment;

at least a first and second tapped holes in the attachment communicating with the respective first and second mating bores, each tapped hole defined about an second axial centerline aligned perpendicular to and offset from the first axial centerline of the respective mating bore;

a screw engaging each said tapped hole; and wherein said screws engagedly connect with said flanged pins after being received in the respective mating bore, the screws axially tensioning said pin relative to the valve body to draw said attachment into desired physical contact with said valve body.

* * * * *